July 30, 1963  W. A. HICKOX  3,099,511
INDICATING AND RECORDING INSTRUMENT ORGANIZATION
Filed March 15, 1960  5 Sheets-Sheet 1

INVENTOR
Walter A. Hickox
BY *Eldon H. Luther*
ATTORNEY

INVENTOR
Walter A. Hickox

BY *Eldon H. Luther*

ATTORNEY

INVENTOR
Walter A. Hickox
ATTORNEY

INVENTOR
Walter A. Hickox
BY *Eldon H. Luther*
ATTORNEY

United States Patent Office 3,099,511
Patented July 30, 1963

3,099,511
INDICATING AND RECORDING INSTRUMENT
ORGANIZATION
Walter A. Hickox, Glen Cove, N.Y., assignor to Combustion Engineering, Inc., New York, N.Y., a corporation of Delaware
Filed Mar. 15, 1960, Ser. No. 15,241
12 Claims. (Cl. 346—17)

This invention relates generally to instruments such as used in the control room of power plants for indicating and recording various parameters of the plant and has particular relation to an instrument organization for simultaneously indicating and recording a plurality of such parameters.

In accordance with the invention there is provided an organization that includes a plurality of indicating-recording assemblies each of which assemblies is organized to provide a current or present indication of the control point and the actual value of a parameter as well as recording short term trends or, in other words, a relatively short term record of the parameter.

The several assemblies are arranged in side-by-side relation and each assembly includes an indicator and a recorder. The indicator portion of the assemblies are of the same configuration and are organized so that an elongated scale is moved with relation to a stationary bezel index to indicate the control or set point. These bezel indexes are disposed or arranged in a line and a pointer is provided to cooperate with the scale to indicate the actual value of the particular parameter. With this arrangement when each of the values for each of the indicator-recorder assemblies is at its control point, each pointer will be opposite its respective bezel index and accordingly all of the pointers will be in alignment. If the value of the parameter that is measured is not at its control point that particular assembly will have its pointer displaced from its bezel index and accordingly out of alignment with the other pointers. This provides an easily readable arrangement for an operator, making it very obvious at a glance, when one of the parameters is varying from its control point.

The recorder of the assembly is positioned adjacent one end of the scale and includes a motor driven chart and a stylus that is actuated in accordance with variations in the parameter being measured, marking the chart accordingly.

Each of the indicator-recorder assemblies includes mechanism to move the scale in accordance with variations in the set point so that the bezel index indicates the particular set point with relation to the scale. The pointer that cooperates with the scale is moved in accordance with variations of the parameter being measured and mechanism is provided to move the pointer with the scale when the set point is adjusted so that adjustment of the set point does not effect the reading of the pointer with relation to the scale. The pointer and the stylus are driven from the same servo motor and mechanism is provided so that the stylus remains stationary when the pointer is moved as a result of changing the set point. It is an object of this invention to provide an improved indicator-recorder organization.

It is a further object to provide such an improved organization wherein a plurality of parameters are simultaneously measured and recorded with the organization being compact and easy to read.

It is a further object of this invention to provide such an organization comprised of a plurality of indicator-recorder assemblies with the assemblies being arranged in side-by-side relation and with each assembly being organized to provide an indication of a set point of a parameter, the value of the parameter, and provide a short term record of the value of the parameter.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figure 3:
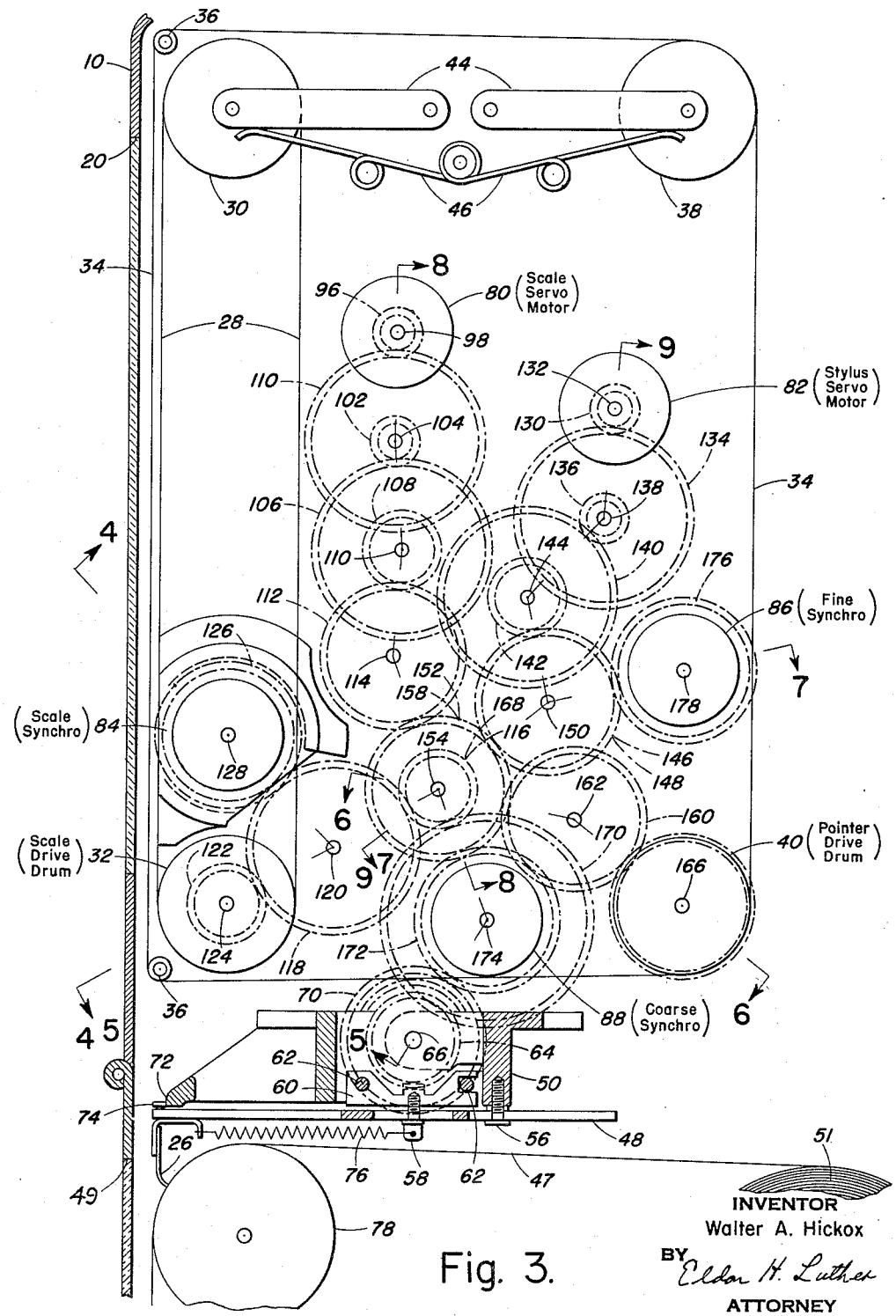
FIG. 3 is a view taken from the right side of one of the indicator-recorder assemblies with this view indicating the gear layout of the assembly.
Figure 4:
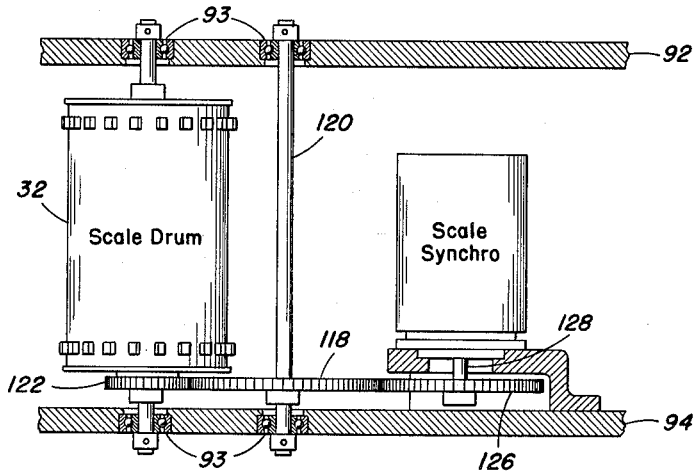
Figure 5:
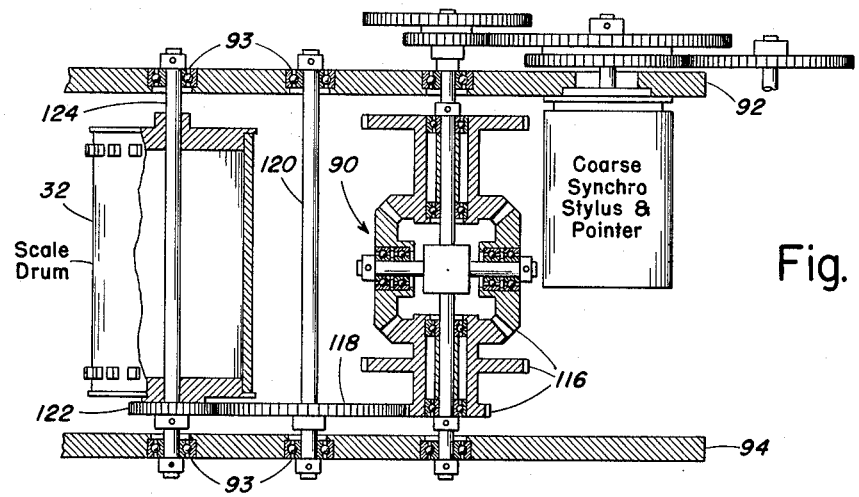
Figure 6:
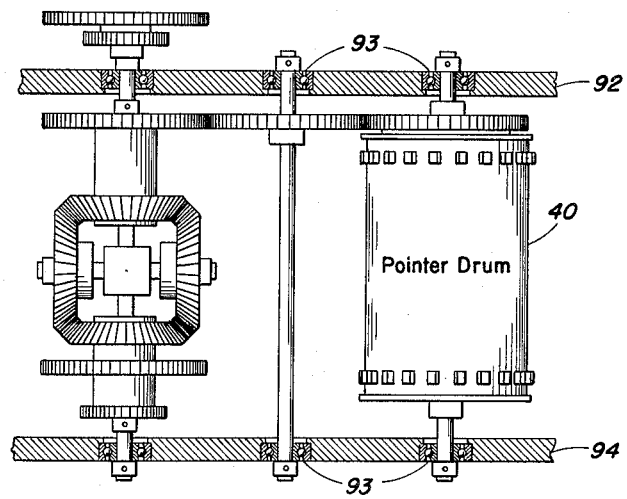
Figure 7:
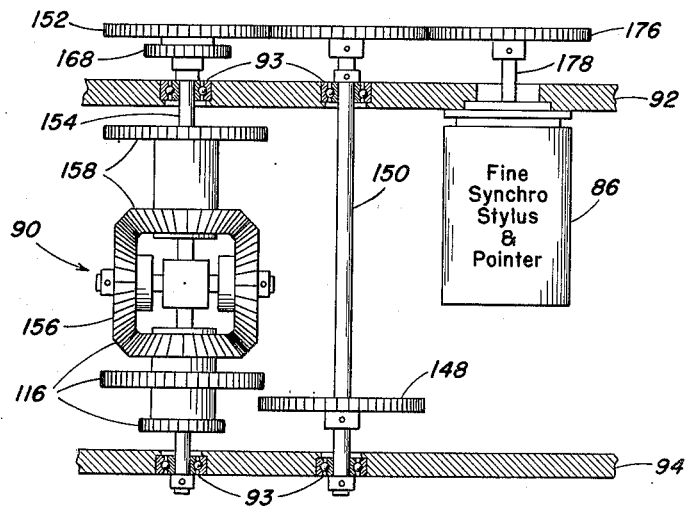
Figure 8:
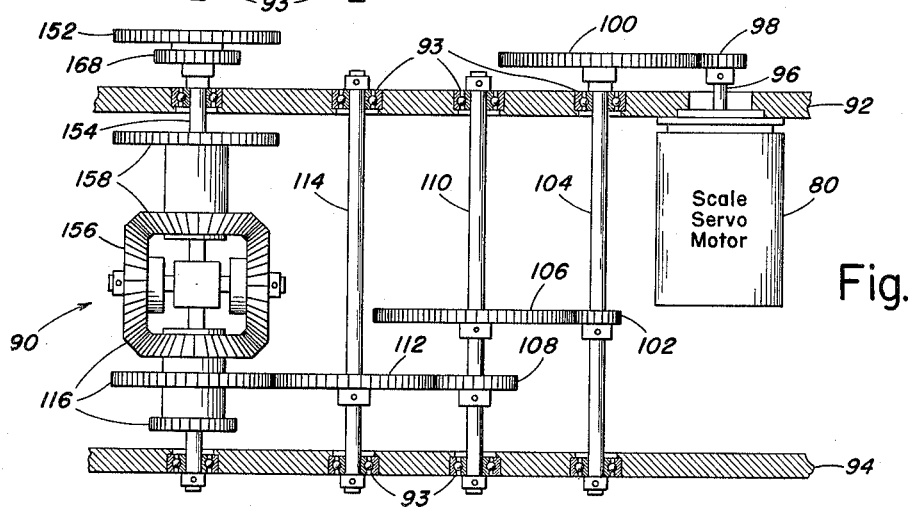
Figure 9:
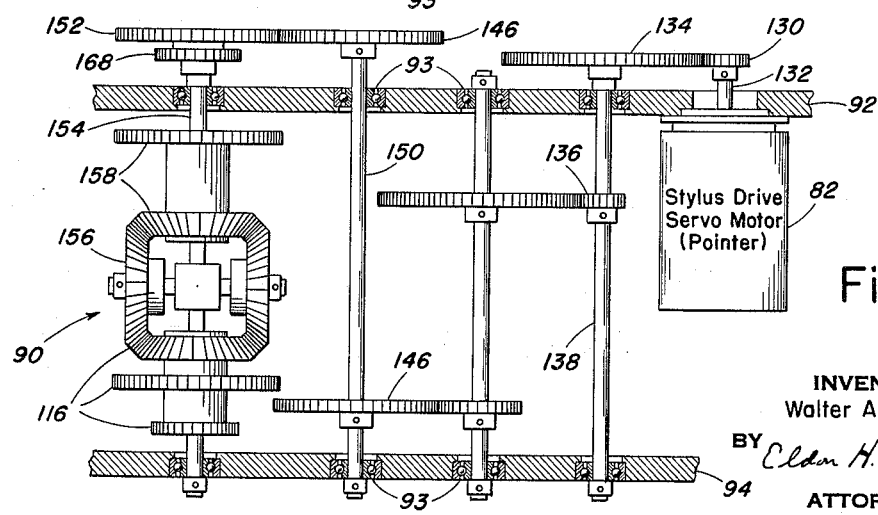

FIGS. 4, 5, 6, 7, 8 and 9 are fragmentary sectional views through the drive mechanism of the indicator-recorder assembly of FIG. 3 with these views being taken respectively along lines 4—4, 5—5, 6—6, 7—7, 8—8 and 9—9 of FIG. 3.

Figure 10:
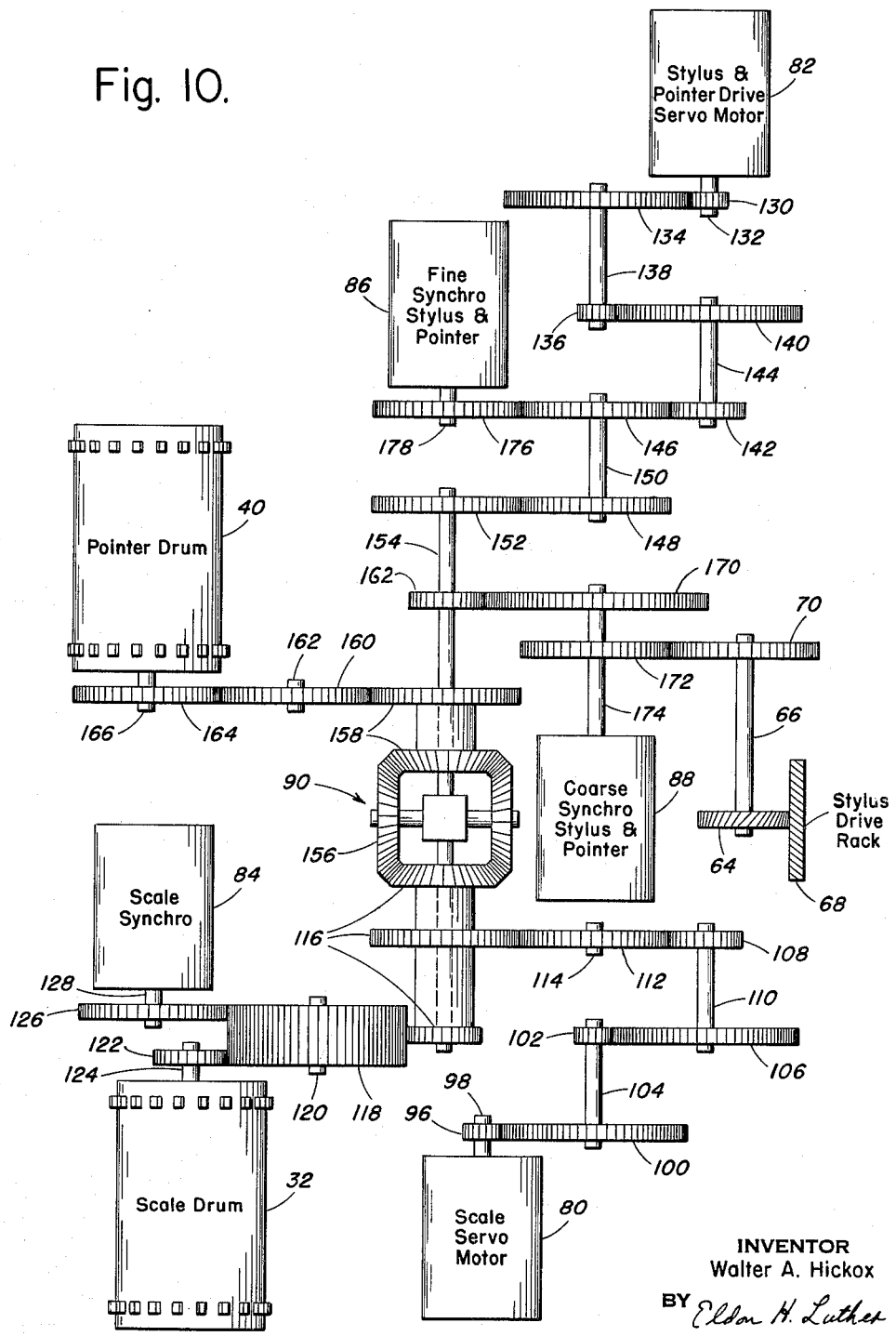

FIG. 10 is a diagrammatic representation or flat schematic of the drive mechanism for one of the indicator-recorder assemblies.

Referring now to the drawings, wherein like reference characters are used throughout to designate like elements, the organization of the invention depicted therein, includes a plurality of indicator-recorder assemblies disposed in housing 10, with the illustrative assemblies indicating and recording various parameters in a power plant. As shown, there are four indicator-recorder assemblies in the housing 10 with assembly 12 indicating and recording the water wall outlet temperature of the steam generator that forms part of a power plant, assembly 14 indicating and recording feedwater temperature, assembly 16 indicating and recording superheater inlet temperature and assembly 18 indicating and recording superheat outlet temperature. The indicating portion of each of the assemblies includes elongated window 20 formed in the front of face of housing 10 with the window wall providing the bezel index 22.

Figure 1:
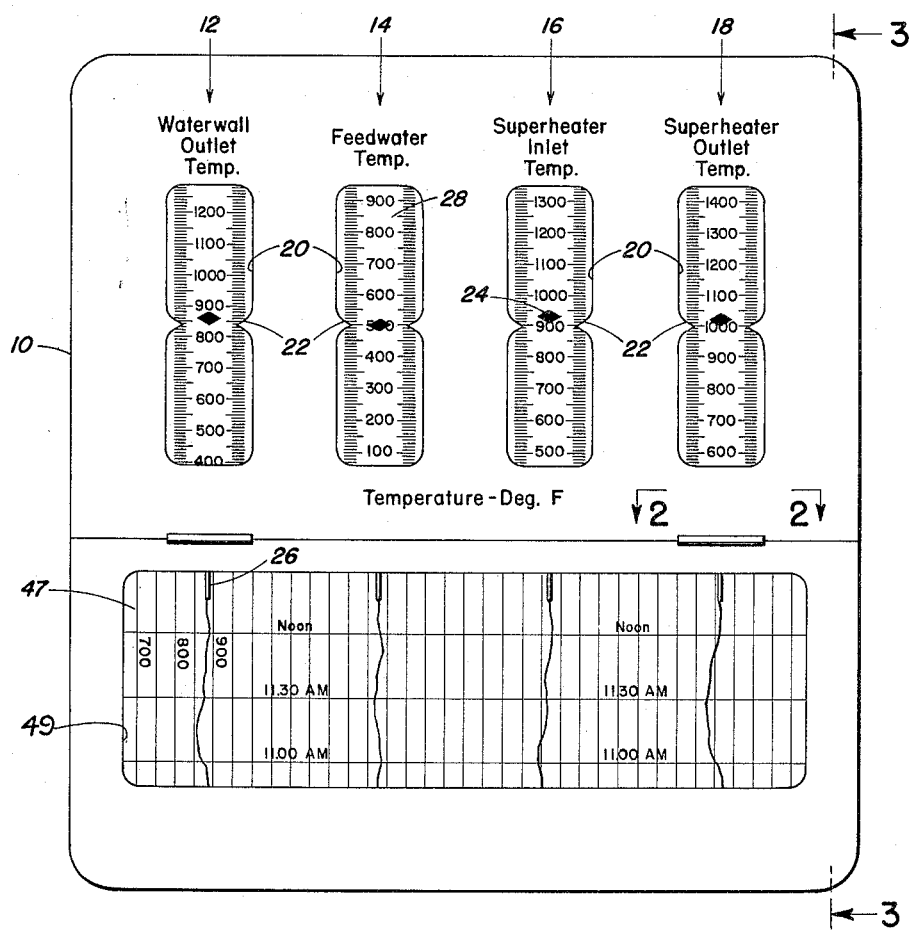
FIG. 1 is a front elevational view of an indicator-recorder organization construction in accordance with the present invention.
Figure 2:
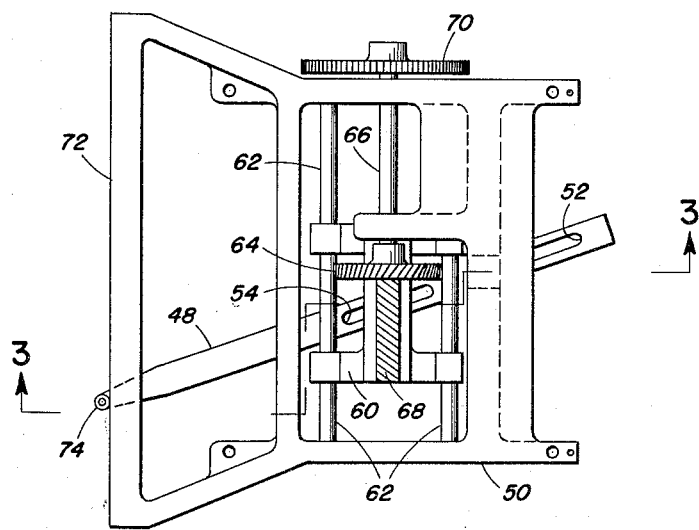
FIG. 2 is a detailed top view of the stylus drive mechanism.

This index cooperates with a scale formed on a suitable endless tape 28 that is positioned to the rear of the window as viewed in FIG. 1, with the index reading, with relation to the scale, the set point for the particular parameter. In the FIG. 1 illustration the set point for the waterwall temperature, the feedwater temperature, the superheater inlet temperature and the superheater outlet temperature, are 840, 500, 900 and 1000° F. respectively.

Cooperating with the scale is a pointer which is formed on a transparent endless tape 34 that is positioned between the scale and the window 20. This pointer is identified as 24 in FIG. 1, is adjusted or moved in accordance with the parameter being measured and indicates with relation to the scale the actual value of the parameter. In the FIG. 1 illustration, the actual value of the parameter should be the same as the set point when the power plant is operating as it should.

The indicating portions of the indicator-recorder assemblies are positioned in side-by-side relation as shown in FIG. 1 and the bezel indexes are aligned wherefor an operator may merely glance at the instrument organization and tell immediately whether or not everything is in order, since when such is the case the pointers are aligned. When one of the pointers moves substantially away or is displaced substantially from the bezel index, this indicates that this parameter has varied from its control point.

Immediately below each of the indicators is disposed a recorder in the form of a motor driven chart 47 (FIGS. 1 and 3) which is viewed through opening 49 in the front of housing 10 with a common chart being employed for all assemblies and which extends almost the full distance across housing 10. This chart is unwound from supply roll 51 (FIG. 3) by the drive roll 78 over which the chart passes. Each indicator-recorder assembly includes a stylus 26 which is maintained below the indicating portion of the assembly and engages the chart. The chart contains suitable labeled or identified graduations and the stylus is moved in accordance with the parameter being measured so that a continuous record of the parameter is provided. As embodied, the chart moves from its upper to its lower region with the chart being automatically folded into a stack at the bottom of the recorder and with the chart being horizontally perforated at suitable locations so that any portion of the chart may be torn off or removed whenever desired.

Each of the indicator-recorder assemblies is similarly constructed and FIGS. 2 through 10 show, in detail, the construction of one of the assemblies.

Referring to FIG. 3, endless tape 28, which is provided with the scale, is mounted between drums 30 and 32 with the tape being perforated at its edges to receive complementary teeth provided on and forming part of lower drum 32, which is the driving drum for the scale tape. The pointer tape 34 extends between rollers 36 at the front of the instrument housing and over the drums 38 and 40 at the rear of the instrument housing. This pointer tape is located between the scale tape 28 and window 20 as shown and the pointer tape is driven by drum 40 which is also provided with teeth at each end thereof that cooperate with perforations in the tape. Tension is maintained in each of the tapes 28 and 34 by spring loaded drums 30 and 38 respectively through the medium of pivotal mounting members 44 and springs 46.

The stylus 26 which cooperates with the motor driven recorder chart 47 is preferably an electric stylus, as is now in common use, and is mounted on arm 48 (FIGS. 2 and 3) with the stylus engaging the chart 47 where it passes over roller 78, as shown in FIG. 3, and the material of the chart being suitable for use with the electric stylus. This arm 48 is mounted on the lower portion of the stylus assembly frame 50 with the arm being provided with elongated slots 52 and 54 and with set screw 56 extending through slot 52 into frame 50 and set screw 58 extending through slot 54 into carriage 60. Each of these set screws is provided with an enlarged head so that arm 48 is slidably mounted on the shoulder of the head portion of the set screws. Carriage 60 is slidably mounted on the rods 62 extending between the sides of frame 50 and this carriage is driven back and forth along these rods by means of the helical gear 64 which is mounted on shaft 66 and which engages the helical rack 68 that forms part of the carriage. At the outer end of shaft 66 is mounted gear 70 which is driven by the drive mechanism of the indicator-recorder as explained hereinafter. At the front of frame 50 is provided a straight edge 72 that is engaged by bearing or roller 74 formed on the front portion of arm 48. Tension spring 76 is effective to continuously urge this bearing into engagement with straight edge 72. Accordingly, as carriage 60 moves back and forth across frame 50, stylus 26 moves back and forth across chart 47 with the stylus moving in a straight line and directly proportional to rack motion and with arm 48 pivoting about axis of set screw 56. The drum 78 is effective to drive the chart at the desired rate of speed and as the chart passes over the drum, the stylus continuously scribes it. By constructing the stylus assembly frame 50, as shown, with an outwardly flared front portion the straight edge 72 is of the desired length for the necessary movement of the stylus and yet the stylus assemblies of adjacent recorders may be abutting or immediately adjacent side by side relation.

The mechanism for driving the indicator recorder assembly of the invention includes servomotor 80 (FIGS. 3 and 10) which is effective to drive the scale tape and accordingly change the set point of the parameter and servomotor 82 which is effective to drive both the pointer tape and the stylus to adjust these elements in accordance with variations in the parameter being sensed. The instrument is operated by means of a signal that is created by a synchro which forms part of the sensing organization for the particular parameter and which is known in the art as the transmitting synchro. The transmitting synchro transmits a signal which is compared with a signal from the receiver synchro in the recorder and the resulting error signal is amplified and is effective to operate the particular servomotor. In operating this servomotor the receiver synchro, which forms part of the indicating recorder instrument, is moved or operated. The servomotor positions the receiver synchro in accordance with transmitter synchro and when it is thus repositioned so that the signal originally developed and which was the voltage difference between the transmitter and receiver synchro is reduced to zero value, the servomotor ceases to operate. This is the conventional manner in which instruments employing synchros and rebalancing servos operate.

In the indicator-recorder of the invention, servomotor 80 (FIG. 10), repositions the receiver synchro 84, while servomotor 82 repositions the receiver synchros 86 and 88. Two synchros are provided in the drive system for the pointer and the stylus with synchro 86 being a fine synchro and synchro 88 being a coarse synchro. This is necessary because the synchro 86 will travel more than 360° for the maximum range of movement of the pointer 24 on the pointer tape 34 and in order to prevent the synchro from stopping at the false zero that is either 180° or 360° from the true value, the fine and coarse synchro arrangement is provided with this being well known and conventional for the purpose that it is here being used.

The set point of the particular parameter that is being controlled is changed by moving scale tape 28 relative to the bezel index 22. It will be appreciated that when the scale tape is moved, pointer 24 must move with the tape in order for the pointer to indicate the actual value of the parameter being measured. Since the pointer 24 and the stylus 26 are driven by the same servomotor, the drive mechanism for the indicator-recorder must be such that pointer 24 will move with tape 28 and accordingly be driven by the servomotor 80 which drives the scale tape, while at the same time the stylus 26 must remain unchanged in its position as a result of adjustment of scale tape 28. This operation is achieved by means of the drive gearing of the indicator-recorder assembly which includes the differential identified generally as 90 (FIG. 10). This gearing as well as the drums and rollers for the pointer and scale tapes are supported by a pair of spaced plates (FIGS. 5–9) which extend rearwardly from the face of housing 10 with plate 92 being located at the right of the indicator-recorder assembly as viewed from the front and plate 94 being located at the left and with the support shafts for the various drums and gearing extending between and being received in suitable bearings 93 in these plates.

The drive drum 32 for the scale tape 28 is driven from servomotor 80 through gearing (best shown in FIG. 10) that includes gear 96 mounted on motor shaft 98, gears 100 and 102 mounted on shaft 104, gears 106 and 108 mounted on shaft 110, gear 112 on shaft 114, sun gear cluster 116 of differential 90, gear 118 on shaft 120 and gear 122 on the shaft 124 of drum 32. The receiver synchro 84 is driven from this same train with gear 126 on shaft 128 of this synchro engaging gear 118. This gear train drive provides a large gear reduction which is necessary because of the low torque and the high speed of the servomotor 80.

Pointer drive drum 40 and accordingly the pointer tape 34, is driven by servomotor 82 through the gear train that includes gear 130 mounted on shaft 132, gears 134 and 136 on shaft 138, gears 140 and 142 on shaft 144, gears 146 and 148 on shaft 150, gear 152 on shaft 154 which is connected with the cross of the differential and accordingly drives planetary gears 156 about the axis of this shaft 154, sun gear cluster 158, gear 160 on shaft 162, and gear 164 on shaft 166 of drum 40. This gear train also provides a large gear reduction for driving pointer drum 40 from low torque, high speed motor 82.

The stylus 26 is also driven from servomotor 82 with gear train for the stylus including the gear drive 130 through 152 and additionally including gear 162 mounted on shaft 154, gears 170 and 172 mounted on shaft 174 of the coarse synchro 88, and gear 70 mounted on shaft 66 and which drives the helical gear 64 which in turn drives rack 68.

The fine synchro 86 is driven from the gear train which drives pointer drum 40 and stylus 26 with the fine synchro having gear 176 mounted upon its shaft 178 and engaging gear 146 of this gear train.

The differential 90 is operative to cause pointer drum 40 to move simultaneously with scale drum 32 as a result of servomotor 80 being operated. This is brought about by servomotor 80 driving sun gear cluster 116 which in turn causes sun gear cluster 158 to also be driven when the cross of the differential is not moved and accordingly both the pointer drum 40 and the scale drum 32 will be rotated with the gearing being such that these drums are rotated so the pointer 24 moves the same distance as the scale tape and accordingly occupies the same position relative to the scale as a result of adjusting the scale to change the set point. It will be appreciated that while servomotor 80 is effective to drive both the pointer drum 40 and scale drum 32, it is ineffective to drive the stylus 26. This is so because when sun gear cluster 116 is operated by means of motor 80 the cross of the differential will be effectively held substantially through the action of synchros 86 and 88 together with servomotor 82. Any attempt to move the cross of the differential by sun gear 116 and accordingly rotate shaft 154 will displace the synchros 86 and 88 which will result in servomotor 82 being operated to move the synchros back to their original position. While pointer drum 40 and scale drum 32 are both driven by motor 80, servomotor 82 is effective to simultaneously drive the stylus 26 and the pointer drum 40 but ineffective to drive the scale drum 32. Thus the servomotor 82 displaces the pointer 24 relative to the scale so as to indicate the actual value of the particular parameter and the stylus 26 moves across the chart 47 to provide a record of the value of this parameter. When motor 82 is driving pointer drum 40 the cross of differential 90 is rotated and since the scale drum 32 is retained in its particular position by the action of synchro 84 and servomotor 80, the driving of this cross of the differential causes sun gear cluster 158 to rotate and thus rotate the pointer drum 40 and the gearing together with the stylus assembly is such that the pointer indicates the value of the parameter on the scale and the stylus records the value of the parameter on the chart.

Accordingly, with the gear drive mechanism of the invention the desired action of moving the pointer and scale simultaneously when changing the set point and leaving the position of the stylus unchanged when changing the set point and also simultaneously operating the pointer and the stylus in accordance with variations in the parameter being measured is accomplished.

It will thus be seen that with the organization of the present organization an indicating and recording arrangement is provided which permits the stylus and the pointer to be operated by a common servomotor and yet achieve the results desired of simultaneously adjusting the scale and the pointer when changing the set point, with the invention also providing an organization which makes it an easy task for the observer to detect when a particular parameter has varied from its set point and with the entire organization being extremely compact.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A plurality of indicating means to indicate the value of a plurality of different parameters, each such means including a separate movable elongated strip suitably graduated, a bezel index for the strip, means to adjust the strip to read the set point of the parameter at said index, a pointer associated with the strip, means to adjust the pointer relative to the strip to read the value of the parameter, means to properly position the pointer relative to the strip when the set point is changed, said plurality of indicating means being mounted in closely spaced side-by-side relation wtih the bezel indices being aligned.

2. A plurality of indicating means to indicate the value of a plurality of different parameters, each such means including a separate movable elongated strip suitably graduated, a bezel index for the strip, means to adjust the strip to read the set point of the parameter at said index, a pointer associated with the strip, means to adjust the pointer relative to the strip to read the value of the parameter, said plurality of indicating means being mounted in closely spaced side-by-side relation with the bezel indices being aligned, said means to adjust the strip relative to bezel index being effective to simultaneously move the pointer relative to this index and so its position relative to the strip remains unchanged.

3. A plurality of indicating means to indicate the value of a plurality of different parameters, each such means including a separate movable elongated strip suitably graduated, a bezel index for the strip, means to adjust the strip to read the set point of the parameter at said index, a pointer associated with the strip, means to adjust the pointer relative to the strip to read the value of the parameter, said plurality of indicating means being mounted in closely spaced side-by-side relation with the bezel indices being aligned, a motor driven time chart adjacent one end of the strips, a separate stylus operative to record each of the parameters indicated, with the stylus for the particular parameter being adjacent the end of the strip employed to indicate the parameter, said chart being suitably graduated to record the parameter, and means to move the stylus relative to the chart in accordance with variations of the value parameter.

4. The organization of claim 3 wherein the pointer and the stylus responsive to a particular parameter are driven by a common motor while the strip is driven by a separate motor.

5. The organization of claim 4 wherein the drive organization for the pointer, stylus and strip includes means to cause the pointer to move with the strip when adjusting the strip to change the control point while the stylus remains unaffected by such adjustment.

6. An indicating and recording instrument including a movable scale, a stationary index cooperating with the scale to indicate the set point of a parameter, a drive for the scale including a motor and gear train to adjust the scale relative to said stationary index to thereby adjust the set point, a movable stylus and motor driven chart operative to record the value of the parameter, a separate drive for the stylus including a motor and gear train, a movable pointer cooperating with the scale to indicate the value of the parameter, means effective to drive the pointer from the stylus drive and independent of the scale drive to indicate the value of the parameter on the scale and means effective to drive the pointer from the scale drive and independent of the stylus drive to move the scale and pointer together when changing the set point.

7. The organization of claim 6 wherein a differential is provided through which the scale drive and the stylus drive are effective to drive the pointer.

8. The organization of claim 6 including a receiving synchro geared to each of the gear train drives and adapted to be electrically interconnected with a transmitting synchro to provide an error signal for actuating the motor of the respective drive.

9. An indicating and recording instrument including a movable scale, a stationary index cooperating with the scale to indicate the set point of a parameter, a drive for the scale including a motor and gear train to adjust the scale relative to said stationary index to thereby adjust the set point, a movable stylus and motor driven chart operative to record the value of the parameter, a separate drive for the stylus including a motor and gear train, a movable pointer cooperating with the scale to indicate the value of the parameter, a mechanical differential effectively connected with the pointer and the drive for the stylus and the drive for the scale and operative to independently drive the pointer from each of these drives.

10. An indicating instrument organization for indicating a plurality of parameters, said organization including a number of endless tapes mounted in relatively closely spaced side-by-side relation, with each being adapted to be moved in a closed path, said tapes having graduations provided thereon, a stationary index for each tape cooperating with the graduations thereon to provide an indication of the set point of the parameter with the several indexes being aligned, motor operated means for adjusting each of the tapes with respect to its respective index to adjust the set point, a pointer means cooperating with each of the tapes for indicating relative to the graduations thereon the value of the parameter for which the stationary index indicates the set point, motor operated means for adjusting each of the pointer means in response to variations of the respective parameter and means causing the pointer to move with the tape when the tape is moved to adjust the set point but provide for independent movement of the pointer relative to the tape for indicating the value of the parameter being measured.

11. The organization of claim 10 wherein the pointer means comprises an endless tape mounted for movement in a closed path and having a pointer formed thereon.

12. In an organization of the type described, housing means having a face provided with a plurality of elongated side-by-side windows, a bezel index associated with each of said windows with these indexes being aligned, an endless tape disposed in back of each window so that one run thereof may be viewed through the window with the tape being movable through a closed path, said tape having graduations thereon which cooperate with the index to indicate the set point of a parameter, means for moving the tape through said path to change the set point, another endless tape having a run disposed between the first mentioned tape and the window, this second mentioned tape having a pointer thereon, means for moving this second mentioned tape through a closed path in response to variations in a parameter with the pointer cooperating with the graduations on the first mentioned tape to indicate the value of the parameter, and means for causing the second mentioned tape to move with the first mentioned tape when the latter is moved and cause the second mentioned tape to move independent of the first mentioned when the second mentioned tape is moved in accordance with variations in the parameter.

References Cited in the file of this patent

UNITED STATES PATENTS

| | | |
|---|---|---|
| 2,151,976 | Koster | Mar. 28, 1939 |
| 2,541,299 | Shannon | Feb. 13, 1951 |
| 2,724,631 | Ruhland | Nov. 22, 1955 |
| 2,915,356 | Reilly | Dec. 1, 1959 |
| 3,010,425 | Peavey | Nov. 28, 1961 |